United States Patent [19]

Russell

[11] Patent Number: 4,875,219
[45] Date of Patent: Oct. 17, 1989

[54] PHASE-CONJUGATE RESONATOR

[75] Inventor: Stephen D. Russell, Starkville, Miss.

[73] Assignee: The United States of America as represented by the Secretary of the Army, Washington, D.C.

[21] Appl. No.: 276,981

[22] Filed: Nov. 28, 1988

[51] Int. Cl.$^4$ ............................. H01S 3/30; H01S 3/23
[52] U.S. Cl. ......................................... 372/92; 372/99; 372/101; 372/108
[58] Field of Search ....................... 372/19, 25, 92, 99, 372/101, 106, 108, 68; 330/4.3

[56] References Cited

U.S. PATENT DOCUMENTS

| | | | |
|---|---|---|---|
| 3,863,177 | 1/1975 | Damen et al. | 372/101 |
| 3,938,058 | 2/1976 | Yamamoto | 372/101 |
| 4,573,157 | 2/1986 | O'Meara | 372/19 |
| 4,682,340 | 7/1987 | Dave et al. | 372/99 |
| 4,734,911 | 3/1988 | Bruesselbach | 372/99 |
| 4,794,344 | 12/1988 | Johnson | 372/108 |

Primary Examiner—James W. Davie
Attorney, Agent, or Firm—Freddie M. Bush; Hay Kyung Chang

[57] ABSTRACT

By incorporating a phase-conjugating process (Stimulated Brillouin Scattering) with a master oscillator power amplifier laser cavity, a new phase conjugate resonator (PCR) is obtained. The PCR utilizes flashlamp-pumped dye lasers and a resonator cavity that is formed by a 100% mirror on one end and a Stimulated Brillouin Scattering (SBS) cell on the other end. The SBS cell functions as one of the mirrors of the resonator and causes the entire system to operate as a phase conjugate resonator. The result is vastly improved (an order of magnitude) beam qualities over conventional resonators for large lamp systems.

6 Claims, 1 Drawing Sheet

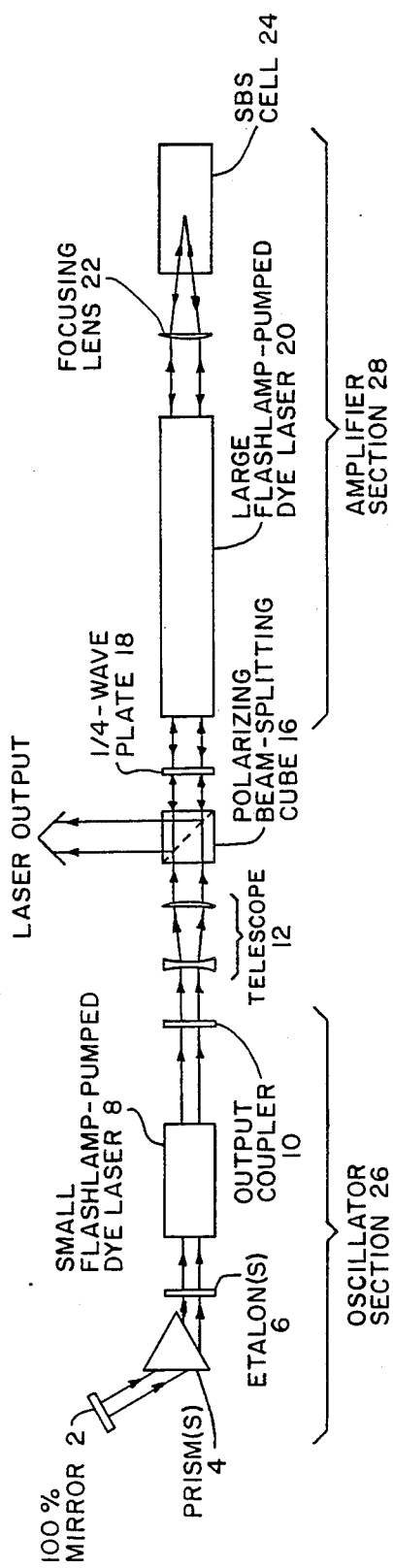

PHASE-CONJUGATE RESONATOR

DEDICATORY CLAUSE

The invention described herein may be manufactured, used, and licensed by or for the Government for governmental purposes without the payment to me of any royalties thereon.

BACKGROUND OF THE INVENTION

In the course of an experiment to test an equipment setup which was expected to perform as an oscillator with a phase conjugated amplifier, it was discovered that the system was actually performing as a phase-conjugate resonator (PCR) and not as an oscillator with a phase conjugate amplifier.

SUMMARY OF THE INVENTION

A phase-conjugate resonator (PCR) is discovered which uses a Stimulated Brillouin Scattering (SBS) phase conjugation cell as one of the resonator mirrors and which works for long pulse lengths. This PCR functions with flashlamp-pumped dye lasers and produces vastly improved (an order of magnitude) beam qualities over conventional resonators for large lamp systems.

DESCRIPTION OF THE DRAWING

The single figure illustrates a preferred embodiment of the phase-conjugate resonator.

DESCRIPTION OF THE PREFERRED EMBODIMENT

Now referring to the drawing wherein like numbers refer to like parts, the Figure diagrammatically shows how a PCR using an SBS cell as a resonator mirror is constructed. The PCR cavity is formed by a 100% mirror 2 at one end and an SBS cell 24 at the other end. Light is generated by a small flashlamp-pumped dye laser 8 within an oscillator section 26 of the resonator. This light oscillates between 100% mirror 2 and partially reflective output coupler 10. Situated in the path of the oscillating beam between the mirror and coupler are one or more prisms 4, one or more etalons 6 and laser 8. The prism and etalons are used to achieve polarization and linewidth requirements of the beam. Dye laser 8 also contains a small gain volume which assures production of a high quality beam that is critical for the initiation of the entire PCR. The 100% reflective mirror 2, prism 4, etalons 6, dye laser 8 and output coupler 10 comprise the oscillator section 26 of the PCR. A part of the beam oscillating inside the oscillator 26 is outcoupled through outcoupler 10 toward telescope 12 which expands the beam before it reaches polarizing beam-splitting cube 16 and $\frac{1}{4}$-wave plate 18. The combination of the beam-splitting cube and the $\frac{1}{4}$-wave plate allows light from the oscillator to pass through on its path toward SBS cell 24. However, the combination blocks most of the light from re-entering the oscillator section from amplifier section 28. Amplifier section is comprised of large flashlamp-pumped dye laser 20, focusing lens 22 and SBS cell 24. After passing through $\frac{1}{4}$-wave plate 18 on its path to SBS cell 24, the beam enters large flashlamp-pumped dye laser 20 which is a large volume gain medium. The beam is then amplified by dye laser 20 and directed to focusing lens 22 which focuses the beam to an energy level sufficient to reach the threshold of the particular SBS cell 24. The threshold differs depending on the medium used in the cell. In the subject experiment, the medium used was methane gas.

SBS cell 24 functions as a phase conjugate mirror and reflects the beam back toward the oscillator section. However, beam-splitting cube 16 prevents re-entry of the beam, except for a small amount of light which passes from the amplifier section back into the oscillator as explained hereinbelow. Most of the beam is ejected by the beam splitting cube out of the resonator cavity as useful light output.

There are two main conditions to be met for successful operation of the PCR. The first is that the initial laser pulse coming out of the oscillator section must have enough energy by the time it reaches the SBS cell to achieve the SBS threshold. This condition is met when the amplifier gain of the amplifier section 28 is high enough that the amplified oscillator pulse is above SBS threshold when it reaches SBS cell 24. The second condition is that the leakage of the small amount of light back into the oscillator section occur. This small amount of energy that enters the oscillator reflects off of the 100% mirror and part of it is outcoupled into the amplifier whose high gain boosts the energy back up to a level so that the SBS process can be maintained. This small feedback can be allowed to occur through thermally induced birefringence or by a slight misalignment of the $\frac{1}{4}$-wave plate.

Some of the advantages of the PCR having an SBS cell as one of its mirrors are that it can be used with flashlamp-pumped dye lasers, high energies out of large gain volumes can be obtained with near diffraction-limited beam quality, high peak powers can be obtained due to a "mode-locking" like phenomenon inherent to the SBS process, and amplifier sections can simply be stacked in series to increase power output. Another important advantage of the phase conjugate resonator is that a long pulse length amplifier can be initiated with a short pulse oscillator. This is due to the fact that even though the oscillator section is necessary to start the SBS process, once the process is started, it will continue even if the oscillator is turned off. This is significant since, in general, the smaller oscillator needs to have good beam quality and a short, fast risetime pulse in order to be an efficient driver for the system. In the amplifier, on the other hand, it is often necessary to have a somewhat longer pulse length, due to the larger physical sizes involved and the energy loading limits, in order to obtain a large output energy. Applicant's invention thus avoids the problem of obtaining an efficient, good beam quality, fast risetime, long pulse width oscillator.

Although a particular embodiment and form of this invention has been illustrated, it is apparent that various modifications and embodiments of the invention, such as stacking amplifier sections in parallel via coherent beam combination techniques, may be made by those skilled in the art without departing from the scope and spirit of the foregoing disclosure. Accordingly, the scope of the invention should be limited only by the claims appended hereto.

I claim:

1. A phase-conjugate resonator, comprising: an oscillator for generating and oscillating light, said oscillator having a partially reflective outcoupler for transmitting a part of said light; an amplifier for receiving transmitted light from said oscillator outcoupler, said amplifier having a stimulated Brillouin Scattering cell to function as a phase conjugate mirror; a beam expansion means between said oscillator and said amplifier; combination of a polarizing beam splitting cube and a ¼-wave plate between said beam expansion means and said amplifier for transmitting said light from said expansion means to said amplifier, for outcoupling useful light output from said resonator, and for directing a portion of light from said amplifier back to said oscillator as feedback; and said oscillator further comprising a first flashlamp-pumped dye laser for generating and amplifying light, a reflecting mirror to reflect said light, and means for polarizing and selectively adjusting linewidth of said light.

2. A phase-conjugate resonator as set forth in claim 1 wherein said amplifier further comprises second flashlamp-pumped dye laser for receiving said light from said ¼-wave plate and amplifying said light, means for focusing said light from said second laser and directing said focused light toward said Stimulated Brillouin Scattering cell.

3. A phase-conjugate resonator as set forth in claim 2 wherein said first flashlamp-pumped dye laser is smaller than said second flashlamp-pumped dye laser.

4. A phase-conjugate resonator as set forth in claim 3 wherein said beam expansion means is a telescope.

5. A phase-conjugate resonator as set forth in claim 4 wherein said means for polarizing and selectively adjusting is prisms and etalons.

6. A phase-conjugate resonator as set forth in claim 5 wherein said focusing means is a convex lens.

* * * * *